3,005,445
WINDSHIELD CLEANER MOTOR
William C. Riester, Buffalo, and Martin Bitzer, Kenmore, N.Y., assignors to Trico Products Corporation, Buffalo, N.Y.
Original application Sept. 26, 1955, Ser. No. 536,683, now Patent No. 2,889,818, dated June 9, 1959. Divided and this application Feb. 20, 1959, Ser. No. 799,832
3 Claims. (Cl. 121—164)

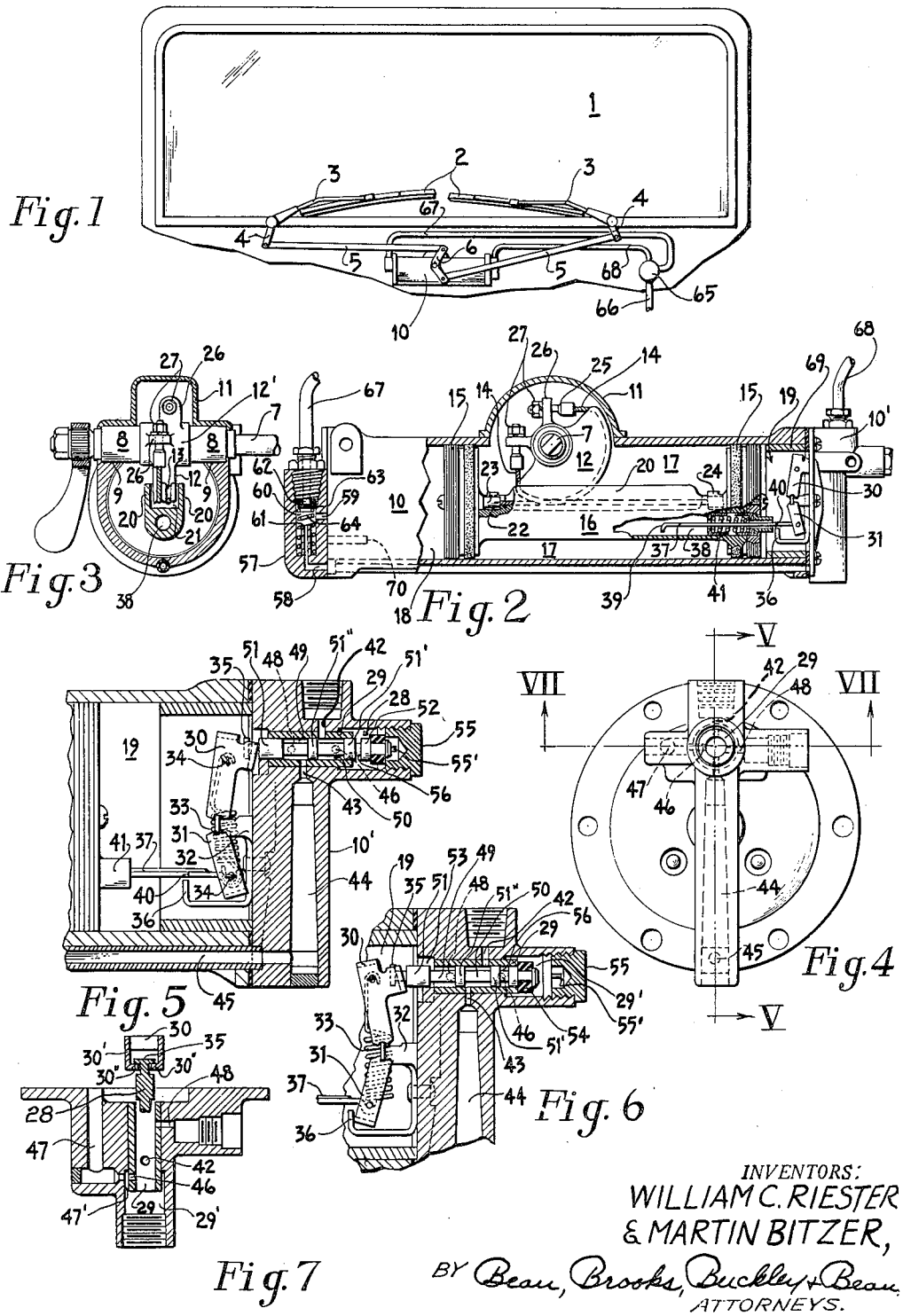

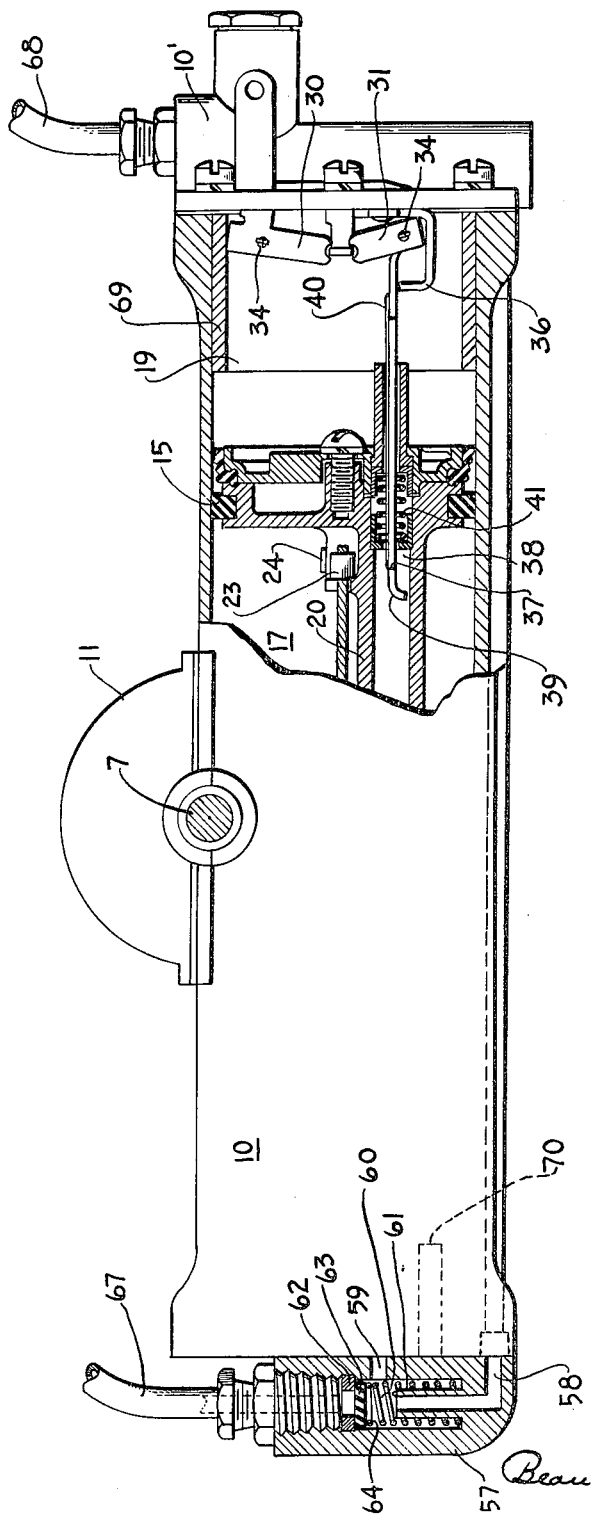

This invention relates to a windshield cleaner and more particularly to the power plant thereof consisting of a pneumatic or fluid pressure motor, the main objective being to provide a gearless motor of the rectilinear type that is quiet in operation, sturdy in construction, and has a minimum wear factor to develop greater driving torque for the oscillation of wipers. This application is a division of our pending application Serial No. 536,683, filed September 26, 1955, now Patent No. 2,889,818.

Pressure actuated motors of the rectilinear class have long been used for oscillating wipers across windshields and utilize a pair of pistons joined in a rigid unit by a rack meshing with a segmental gear which is anchored on a power take-off shaft. The movement of the teeth into and out of intermeshing engagement causes them to slide one upon the other in frictional contact and to produce an operational noise that is objectionable to the motorist. This intermeshing action further causes wear and tear on the teeth which develops an increasing amount of clearance between the two sets of teeth and results in the motor becoming irregular in action, noisier in operation and less efficient in performance. In fact, the intermeshing teeth produce small increments of motion tending toward an intermittent driving action on the shaft. These factors become more apparent in windshield cleaner installations for buses and other vehicles on which the windshield cleaner motor is operated by compressed air and, therefore, develops a high torque in the output shaft. The motor piston is driven at a fast speed and consequently the valve action is likewise tripped quickly though carried along therewith against the reversed pressure differential by reason of the inertia in the heavier wiper arms and blades which is not counteracted for the moment until the inertia carried parts abut stationary portions of the structure with a jarring impact tending to depreciate the efficiency of the motor.

An object of the invention is to provide a pressure operated motor with improved parking means by which the parking pressure is shunted about the running valve mechanism to thereby leave the running mechanism free of such pressure when the motor is in its wiper parking position.

The foregoing and other objects will manifest themselves as this description progresses, reference being made therein to the accompanying drawing, wherein FIG. 1 is a schematic view showing the improved cleaner mounted on the windshield of a motor vehicle;

FIG. 2 is an enlarged view of the motor, with parts in longitudinal section;

FIG. 3 is a transverse sectional view through the medial portion of the motor;

FIG. 4 is an elevation of the valved head of the motor, which supports the running valve;

FIG. 5 is a fragmentary longitudinal sectional view through the motor about on line V—V of FIG. 4, showing the piston valve in one of its two operative positions;

FIG. 6 is a similar view showing the piston valve in its other operative position;

FIG. 7 is a transverse sectional view through the motor head, about on line VII—VII of FIG. 4; and FIG. 8 is a view on an enlarged scale, partly in longitudinal section and partly in side elevation, illustrating details of the cushioned valve tripping mechanism and the parking valve.

Referring more particularly to the drawing, the numeral 1 designates the windshield of a motor vehicle, 2 its wipers, 3 the wiper carrying arms mounted on pivot shafts having rocker arms 4 to which the drive links 5 from a double throw crank 6 are pivotally connected. The drive shaft 7 of the improved motor is journaled in spaced bushings 8 which are arranged in the seats 9 of the generally cylindrical motor body 10 and held in place by a removable cover 11. Fixedly secured on the power take-off shaft 7 is a pulley wheel segment 12 having peripheral grooves 13 for receiving the cables 14 which serve as flexible power transmitting mediums between the shaft unit 7, 12, and the piston unit, the latter comprising spaced heads or pistons 15 and a connecting body portion or spacer 16. The wheel segment 12 is shown as having a hub 12' for receiving the shaft with a driving fit. The hub fits between the bearings 8 to properly position it within the medial chamber 17 of the motor between the opposite end chambers 18 and 19.

The spacer 16 is channel-shaped in cross section to provide marginal upstanding flanges 20 that straddle the wheel segment to guidingly interlock therewith for lateral support against lateral or rotative drift about the longitudinal axis of the motor. This rolling interlock between the wheel segment and the spacer serves to guide the piston unit in its back and forth rectilinear movement in the motor cylinders. At the opposite ends of the channel or guideway 21 are seats 22 to interlockingly receive cable anchoring lugs 23 on the piston-engaged ends of the respective cables where they are detachably retained by overhanging keepers 24. The opposite or wheel engaged ends of the cables are equipped with adjustment fittings 25 having reduced shanks slidably supported in ears 26 on the wheel segment. The shanks are threaded at their outer ends and having nuts 27 threaded thereon to draw the cables taut. By this construction the tensioning stresses are applied axially to the cables to hold them taut, thereby providing a flexible power transmitting connection between piston and shaft which is readily accessible upon removal of the cover 11. The ears 26 are angularly related and placed in such proximity as to dispose the nuts 27 within easy reach and at the same time the ears are offset from each other on the wheel segment to support the cables laterally spaced as they are drawn tight into their peripheral grooves 13. When the nuts 27 are selectively turned they exert a bearing thrust upon interposed lock washers, as shown, to secure their adjustments.

For operatively applying the fluid pressure differential to the piston 15, 16, a pressure-balanced valve mechanism is provided of simple design, the same comprising a single valve member 28 of the piston type that is slidable back and forth within a tubular seat or sleeve 29 by means of a suitable spring snap-action having opposed levers 30 and 31, a supporting bracket 32, and a coiled spring 33 engaged over the lever-carried anchor pins 34. Each lever is formed U-shaped to provide inwardly extending legs that pivot on spaced parts of the bracket 32 to receive the spring therebetween, and from the legs of lever 30 extend ears 30' having inturned shoulders 30" that loosely engage beneath a head 35 on one end of the piston valve to shift it axially back and forth between two operative positions. The bracket 32 has a stop-forming extension 36 to limit the movement of the lever 31 in one direction while movement in the opposite direction is determined by abutment of the lever upon the bracket body as the spring moves back and forth through its position of maximum distension. The lever 31 is slidably connected to the piston by a link 37 having a terminal hook engaging about its spring anchor pin 34 and its opposite end portion slidably received within a chamber 38. The inner extremity of the link is downturned to form a stop shoulder 39 to coact with an opposing stop shoulder 40 to be alternately engaged by the spring cushioned abutment 41 on the piston for moving the lever 31 back and forth to shift the snap-action spring 33 for rocking the valve actuating lever 30 and thereby reversing the pressure differential on the piston.

The sleeve 29 may be formed from brass stock to line its receiving bore within the die-cast motor head 10′, the latter being ported to provide a pressure supply port 42, a chamber port 43 opening through passages 44 and 45 to the motor chamber 18 at the far end of the motor, a chamber port 46 opening through passage 47 into the adjacent motor chamber 19, and an exhaust port 48 alternately connectible to the port 43 and port 53 from the near chamber.

The piston valve is formed with longitudinally spaced recesses 49 and 50 as defined by lands 51 and 51′ and a medial land 51″. In the position illustrated in FIG. 6, the land 51 has uncovered the port 53 to establish communication between the exhaust port 48 and the adjacent chamber 19 to exhaust the air content as the piston moves to the right under the super-atmospheric pressure as applied to the left end of the piston through the supply port 42 and chamber port 43, 44, 45. In its movement to the right, the piston-carried spring abutment 41 will engage the shoulder 40 and act through the snap-action to shift the valve from the position shown in FIG. 6 to the position shown in FIG. 5. In this position of FIG. 5, the pressure supply port 42 is connected to chamber port 46 and to the near chamber 19 while the chamber port 43 is placed in communication with the exhaust port 48, the land 51 having moved within the sleeve or valve compartment to confine the exhaust flow accordingly. By this reversal in the pressure differential, the piston will move to the left until the spring abutment 41 contacts shoulder 39 to again actuate the valve action for reversing the pressure application. For clarity and ease of understanding, the exhaust port 48 has been shown in FIGS. 5 and 6, where it could be, although from FIG. 7 it will appear that it is on the opposite side of the valve compartment or chamber 29′ within the sleeve 29.

An important feature of the present motor is that the piston valve is pressure-balanced to lighten the valve-shifting load on the snap action 30, 31, 33. This is accomplished by opening both ends of the valve to the pressure maintaining in the near chamber 19. To this end, the chamber port 46 has a branch passage 47′ opening into the closed end of the valve chamber 29′ which is accessible upon removal of the closure plug 55. This arrangement constitutes the passages 47 and 47′ as a pressure equalizing passage between the motor chamber 19 and the valve compartment whether it be atmospheric or superatmospheric pressure. Consequently, the snap action will have no pressure seal to break before shifting the valve.

For silencing the valve movement a sound dampening bumper 54 of rubber, felt, or the like, is secured to the outer end of the piston valve to overhang the land 52 to alternately abut opposing shoulders as provided by the adjacent end of the sleeve 29 and the closure nut 55. This feature, together with the silent cable transmission 14 and the cushioned abutment 41 for tripping the valve action, provides a quiet acting motor that will respond to the higher pressure differentials, incidental to the use of compressed air, with a minimum noise from the moving mechanical pairs. The annular shoulder on the nut 55 is provided with a pressure equalizing recess 55′ which avoids any pressure seal when the sound dampening bumper is seated against the nut. When the bumper is seated against the end of the sleeve 29, as in FIG. 6, the pressure equalizing communication between the outer end of the valve compartment and the chamber 19 is provided through the passage 47, 47′, 55′, the port 46 admitting the equalized pressure into a further recess 56 for resisting leakage along the valve from the recess 50.

For parking the cleaner the opposite cylinder head 57 is provided with an angular passage 58, a passage 59, and an interposed valve chamber 60, all forming part of the pressure passage 45 for the far chamber. The passage 58 opens into the valve chamber through a seat 61, and opposing this seat is a parking port 62 that is normally closed by a valve 63 under the urge of a spring 64. When it is desired to park the wipers, compressed air is admitted through the parking port which shifts the valve 63 over onto seat 61 to thereby interrupt the running passage 45 and establish pressure communication between the now opened parking port and passage 59 for admitting the pressure to the chamber 18 to move the piston to its wiper parking position.

A control valve 65, connected to a suitable source of supply by a conduit 66, is adapted to connect the latter to a pipe 67 which leads to the parking port. For normal wiper operation the valve 65 is adjusted to connect the pressure supply through pipe 68 to the supply port 42.

For limiting the parking movement of the piston, there is provided a stop ring 69 which will serve to protect the automatic valve mechanism. A stop pin 70 is carried by the head 57 to limit the piston movement in the opposite direction.

The foregoing description has been given in detail for clarity and without thought of limitation since the inventive principles involved are capable of assuming other physical embodiments without departing from the spirit of the invention and the scope of the appended claims.

What is claimed is:

1. In an air motor for windshield cleaners, a body having a motor chamber, a piston in the chamber, a piston responsive valve mechanism operatively reversing the pressure differential on the piston and comprising a ported valve seat and a cooperating valve relatively movable to so reverse the pressure differential, and means operatively connecting the valve to the piston, said valve mechanism having two chamber ports opening into the chamber at opposite sides of the piston, one chamber port having an interposed parking valve normally closed to place said one chamber port in communication with said valve mechanism and operable to interrupt communication thereof with said valve mechanism, and a control valve operable selectively to alternately connect the valve mechanism and the parking valve to an operating pressure supply source, said parking valve when operative serving to connect the adjacent side of the chamber to the source in shunt relation to said valve mechanism.

2. In a windshield cleaner motor, a motor chamber, a piston movable in said chamber, means for applying a pressure differential on said piston to move the same, said means including reversing valve means operatively reversing the pressure differential on said piston, fluid passage means placing said reversing valve means in communication with said chamber at opposite sides of said piston, parking valve means communicating with said chamber at one side of said piston through fluid passage means common to both said reversing valve means and said parking valve means, said parking valve means being operable to interrupt communication of said reversing valve means with said one side of said chamber, and control valve means selectively operable to connect said parking valve means to a source of operating pressure in shunt relation to said reversing valve means and to connect said reversing valve means to a source of operating pressure in shunt relation to said parking valve means.

3. In a windshield cleaner motor, a motor chamber, a piston movable in said chamber, means for applying a pressure differential on said piston to move the same, said means including reversing valve means reversing the pressure differential on said piston, fluid passage means placing said reversing valve means in communication with said chamber at opposite sides of said piston and including a motor chamber port at one side of said piston, a parking valve chamber interposed in said fluid passage means adjacent said chamber port and in communication therewith, said reversing valve means communicating with said parking valve chamber through a valve seat, a parking port opening into said parking valve chamber, a parking valve, a spring means normally urging said parking valve against said parking port to close the same, said parking valve being movable against the urging of said spring means into engagement with said valve seat upon admission of pressure fluid through said parking port thereby to interrupt communication between said reversing valve means and said motor chamber at said one side of said piston, and means for selectively controlling the admission of pressure fluid to said parking port.

References Cited in the file of this patent

UNITED STATES PATENTS

| | | |
|---|---|---|
| 2,304,279 | Rappl | Dec. 8, 1942 |
| 2,344,949 | Rappl | Mar. 28, 1944 |
| 2,404,747 | Sacchini | July 23, 1946 |
| 2,450,564 | Sacchini | Oct. 5, 1948 |
| 2,584,229 | Sacchini | Feb. 5, 1952 |
| 2,621,634 | Cary | Dec. 16, 1952 |
| 2,674,233 | Sprague et al. | Apr. 6, 1954 |